(12) United States Patent
Chavin

(10) Patent No.: US 7,072,581 B2
(45) Date of Patent: Jul. 4, 2006

(54) APPARATUS AND METHOD FOR SIGNAL RECOGNITION WITHIN WDM OPTICAL NODES

(75) Inventor: Jean Guy Chavin, Navan (CA)

(73) Assignee: Nortel Networks Limited, St. Laurent (CA)

( * ) Notice: Subject to any disclaimer, the term of this patent is extended or adjusted under 35 U.S.C. 154(b) by 642 days.

(21) Appl. No.: 10/014,806

(22) Filed: Dec. 14, 2001

(65) Prior Publication Data
US 2002/0141688 A1    Oct. 3, 2002

(30) Foreign Application Priority Data
Dec. 20, 2000    (CA) .................................... 2329097

(51) Int. Cl.
*H04J 14/00*    (2006.01)
(52) U.S. Cl. .............................. 398/33; 398/56; 398/55
(58) Field of Classification Search .................... 398/1, 398/2, 31, 33, 34, 56, 9, 8, 112, 14, 202, 154, 398/156, 241.1, 244, 252, 253, 45, 46, 25, 398/27, 55
See application file for complete search history.

(56) References Cited

U.S. PATENT DOCUMENTS

| | | | |
|---|---|---|---|
| 5,546,211 A * | 8/1996 | Devon ........................... | 398/98 |
| 6,185,021 B1 * | 2/2001 | Fatehi et al. .................... | 398/9 |
| 6,545,982 B1 * | 4/2003 | Murthy et al. ............... | 370/245 |
| 6,603,112 B1 * | 8/2003 | Medard et al. ......... | 250/227.11 |
| 6,636,529 B1 * | 10/2003 | Goodman et al. .......... | 370/469 |
| 2003/0002108 A1 * | 1/2003 | Ames et al. ................. | 359/152 |

OTHER PUBLICATIONS

Ian Kyles—Optical Switching, Fabric Architectures For Fiber. Optical Designs, Vitesse Semiconductor Corporation.
Rate Independent CDR Chip Locks in at up to 2.7 Gbits/s Patrick Mannon—Electronic Designs.
Applied Micro Circuits Corporation—Rhine Product Brief Version 2.0-Jan. 2002.
OC-192C Packet Over Sonet/SDH IXIA/ in Motion.
Interface Configuration & Monitoring Juniper Networks.
AU1500—IP Core Network Probe Ando. Corporation.

* cited by examiner

*Primary Examiner*—David C. Payne

(57) ABSTRACT

The invention allows the checking of the internal performance of a cross-connect for optical networks with respect to both signal performance and proper connections. In a network comprising a number of interconnected cross-connect devices a spare output line of each cross-connect device is arranged to monitor the input port used by a connection within the cross-connect device. This output is coupled to a Performance Monitor (PM) which determines the bit-rate, type of signal (protocol), and further determines the integrity of the signal. By comparing the results of connection monitoring between a series of cross-connect stages, it is possible to deduce or infer the behavior of the equipment involved in the connection.

5 Claims, 3 Drawing Sheets

APPARATUS AND METHOD FOR SIGNAL RECOGNITION WITHIN WDM OPTICAL NODES

FIELD OF THE INVENTION

The invention lies in the field of Optical Cross-Connects—Dense Wave Division Multiplexing (DWDM), specifically in the area of operation and provisioning of networks.

The purpose of a cross-connect in this context is the provision of both semi-permanent connections as well as more transient connections which might be termed switching.

BACKGROUND OF THE INVENTION

One of the major issues in the telecommunications industry today is the ongoing demand for more and more bandwidth. Today, so-called third generation networks employ Wavelength Division Multiplexing technology where both the transmission and the switching of data are in the optical domain. Dense Wavelength Division Multiplexing (DWDM) involves the process of multiplexing many different wavelength signals onto a single fibre. Use of DWDM allows providers to offer services such as e-mail, video, and multimedia carried as Internet Protocol (IP) data over asynchronous transfer mode (ATM) and voice carried out Synchronous Optical NETwork (SONET) (or Synchronous Digital Hierarchy (SDH). SONET/SDH are defined by a set of related standards for synchronous data transmission over fibre optic networks. The standard for SONET is the United States version and is published by the American National Standards Institute (ANSI). The international version of SDH is the standard published by the International Telecommunications Union (ITU). The differences between SONET and SDH are slight and restricted to the basic frame format.

Despite the fact that these formats—IP, ATM, and SONET/SDH—provide unique bandwidth management capabilities, all three can be transported over the optical layer using DWDM. This unifying capability allows the service provider the flexibility to respond to differing customer demands over one network.

One property of a DWDM optical network is the ability to do wavelength routing. Here, the path of the signal through the network is determined by the wavelength and origin of the signal, as well as the states of the network cross-connects and wavelength changers. Wavelength routing provides a transparent light path between network terminals. A light path is the path that an optical signal traverses in the network from a source to a single destination and may include all-optical wavelength changers.

A property of optical cross-connects is that the optical channels, (also referred to as wavelengths or colours) which are typically fully utilised in carrying data and the related protocols, can be transmitted and inter-connected without knowledge of the data protocol, or even the bit-rate of the data.

There exist cross-connects (including switches, multiplexors, concentrators and interconnects) which need have no knowledge of the data or protocol. These cross-connects act purely at the 'physical layer', the Layer 1 of the International Standards Organisation (ISO) protocol stack. A number of such cross-connects may be co-located to permit higher concentration of traffic thereby taking advantage of the inherent high bandwidth of DWDM transmission systems.

The very nature of the optical path, carrying unknown bit-rate data of unknown protocol, presents problems in managing optical networks. In particular, if a certain cross-connect element, such as cross-point, is introducing errors into the data being carried it is very difficult to determine that it is not functioning correctly so that corrective measures can be taken. Previously, various techniques have been used in attempts to improve the situation. For example, connection integrity monitoring has been used to ensure a signal is connected to the correct port of a cross-connect, but this approach cannot determine whether it is routed correctly within the cross-connect system. Similarly, a monitor at the destination card has been used to determine if a signal is correct, but is unable to trace the signal through the cross-connect system.

What is needed is a cost-effective method for determining both the signal performance and connection integrity of each element of a cross-connect complex.

SUMMARY OF INVENTION

This invention seeks to overcome the problems outlined above by providing a selective mechanism to determine the bit-rate and protocol of a connection across a cross-connect element of a single or multi-stage network, and to measure the performance of that connection in terms of error rate.

The invention is found in a cross-connect for optical networks, examples of which are the "Optera Connect LX Core" and the "Optera 5200 Multi-service platform" both supplied by Nortel Networks. The invention is implemented using a combination of hardware and software modules.

The invention allows the checking of the internal performance of a cross-connect with respect to both signal performance and proper connections.

The present invention is directed to a technique for signal recognition and performance monitoring within a network comprising a number of interconnected cross-connect devices. In a preferred embodiment of the invention, a spare output line of each cross-connect device is arranged to monitor the input port used by a connection within the cross-connect device—a technique referred to as 'snooping'. This function, more formally known as multicasting, is provided inherently by the cross-connect device circuitry which simply splits the incoming signal and passes the signal on two separate paths, in this case the connecting path and the snooping path.

The output of the snooping path is coupled to a Performance Monitor (PM). The PM comprises a Clock and Data Recovery unit (CDR) which provides a data and clock input to a Protocol and Performance Analyser (PPA). The PPA determines the bit-rate, type of signal (protocol), and further determines the integrity of the signal (e.g. error signal) using methods which depend on the actual protocol.

By comparing the results of such 'snooping' on a connection at the inputs of each of a series of cross-connect stages, it is possible to deduce or infer the behaviour of the equipment involved in the connection.

Typically the overall maintenance and performance aspects of an optical transmission and switching system are monitored by an Operation, Administration, Maintenance and Provisioning (OAM&P) subsystem. This subsystem is capable of receiving information from several related systems and presenting that information, possibly in a summarised form, to the maintenance personnel. Typically, it also provides a user interface to allow the manipulation of data used in the administration of complex networks comprising several cross-connects and related systems.

Various strategies are possible, depending on the number of stages, and their size, as well as the degree of concentration of traffic. One strategy is for the OAM&P subsystem ti simply monitor each of the stages for a given connection simultaneously. Any significant degradation of quality can then be pinpointed to a single section. If more than one section is causing degradation, all of the offending stages might be noticed.

Another strategy is for the controlling OAM&P system to monitor complete paths across the all of the cross-connect stages. Monitoring of individual stages can be started if any degradation of the signal is noted.

The 'snooping' can be applied to any of the channels in use across a cross-connect device, and changed as required. This aspect of the invention is sometimes referred to as Time-shared Monitoring.

Typically, cross-connect devices are capable of supporting 'snooping' on several inputs simultaneously. The number of Performance Monitors provided on each switching stage may be adjusted at implementations and for each site to take into account such factors as traffic, error rates and business decisions.

Since the nature of the protocol being used for a particular connection is not generally known, for the invention to be of most benefit, the PPA should be capable of distinguishing between many, if not all, of the protocols carried over the network.

As will be apparent to those skilled in the art, the invention uses a combination of known elements and techniques to perform a task not previously implemented in the art.

Other aspects of the invention will be clear to those skilled in the art on examination of the figures and detailed description following.

DETAILED DESCRIPTION

Figure 1:
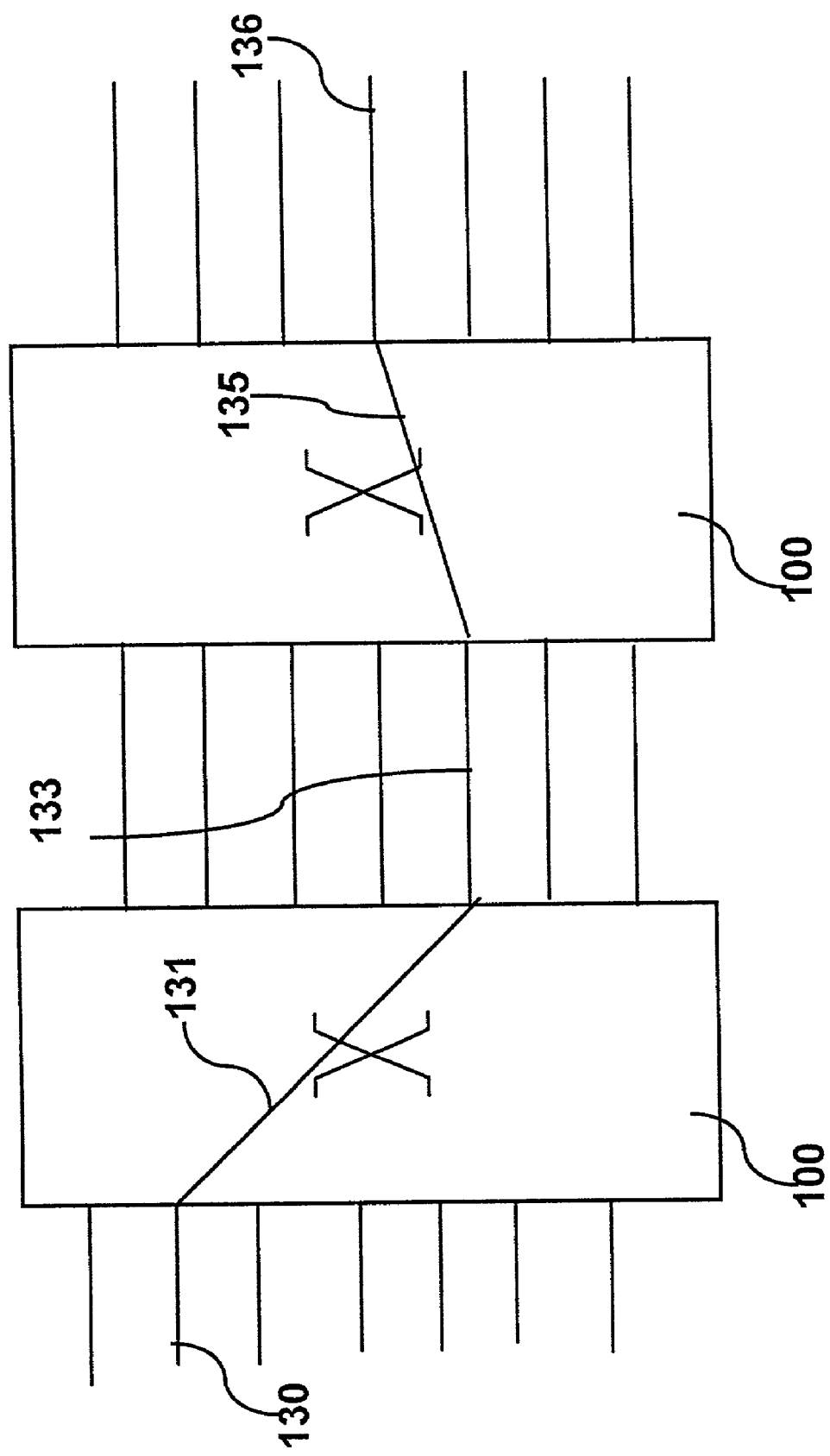
FIG. 1 shows a simple configuration of cross-connect and other elements in which the invention is practised.

Turning to FIG. 1, a typical configuration or environment for the present invention comprises a plurality of cross-connect devices 100, each with a plurality of inputs and outputs, the outputs of the first stage being directly connected to the inputs of the second stage, etc. The connections between stages or cross-connect devices 100 are known as interconnects 133. An example connection across an exemplar two stages cross-connect is shown as 130, 131, 133, 135, 136.

A typical "industry-standard" cross-connect device is the VSC836 by VITESSE Semiconductor Corporation, Camarillo, Calif. This device, also known as an asynchronous cross-point switch, is designed to carry high speed broadband data streams up to 2.5 Gb/s, and includes a non-blocking switch core. Each of the 65 data outputs is driven by a 64:1 multiplexer tree that can be programmed to be connected to any one of its 64 inputs, allowing one input to be multi-cast to several outputs. The signal path is asynchronous, so there were no restrictions on the phase, frequency, or signal pattern at each input, nor is any phase related clock required for retiming.

Figure 2:
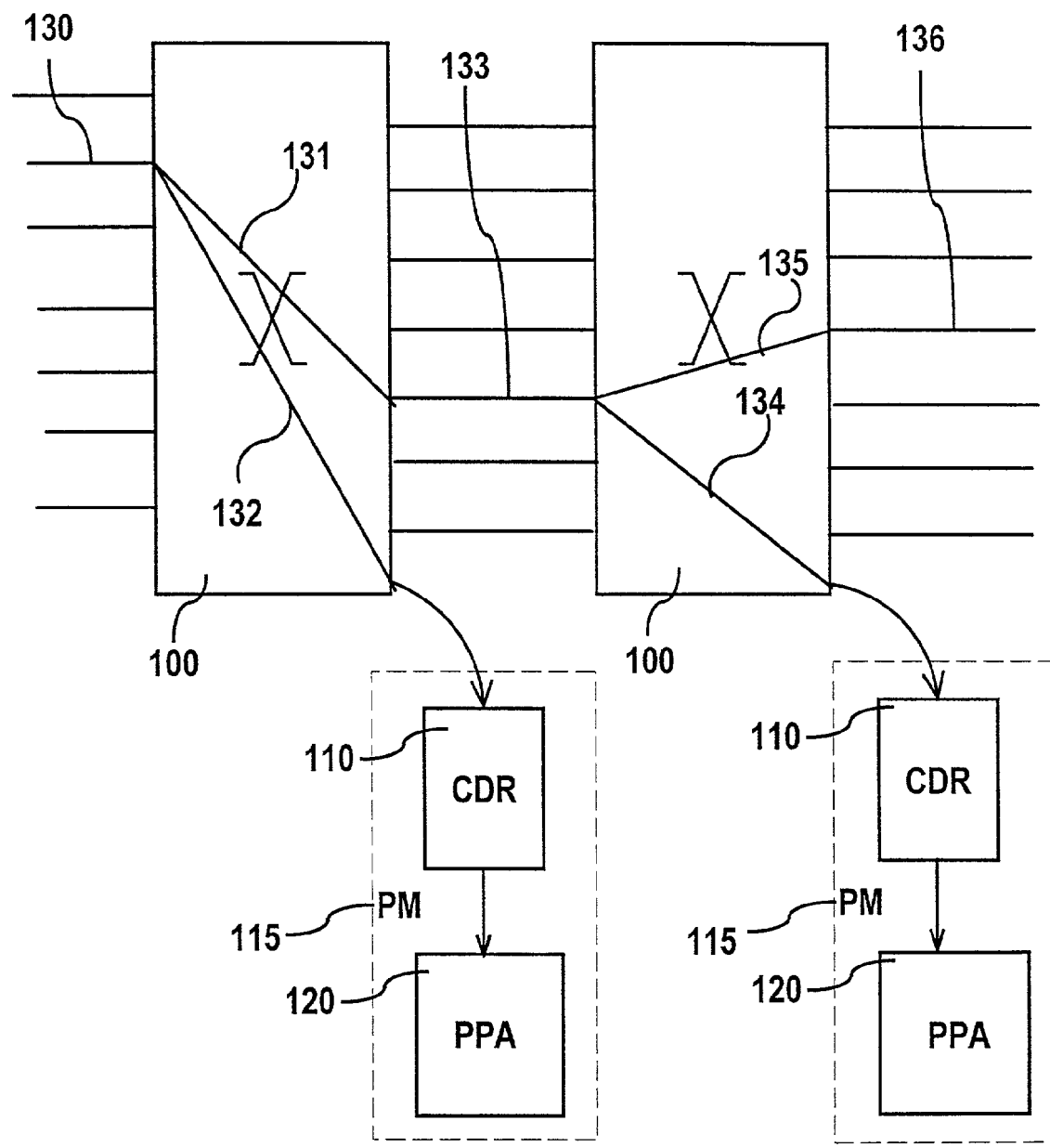
FIG. 2 shows the arrangement of additional equipment and modules required to practice the invention.

Referring now to FIG. 2, one or more of the outputs of a given cross-connect device is not used for carrying normal data traffic, but is assigned for performance monitoring. As before, an example connection across the cross-connect device is shown as 130, 131, 133, 135, 136. During use, each stage of the cross-connect device can arrange for the data being carried on a particular connection to be replicated or multi-cast at the input onto the performance monitoring channels 132, 134. The consequent output from the performance monitoring channels 132, 134 is passed to Performance Monitors (PM) 115. Each PM comprises a Clock and Data Recovery unit (CDR) 110 which passes clock and data information from the connection to a Protocol and Performance Analyser (PPA) 120.

The CDR is exemplified by the commercially available VSC8123 by VITESSE Semiconductor Corporation, Camarillo, Calif. This component is a universal clock and data recovery system designed for a broad range of applications. The integrated frequency synthesizer provides continuous coverage from 10 Mbits/sec to OC-48+FEC data rates with SONET quality output. The VCS8123 offers broadband synthesizer capability. In this application, many of its other attributes are unused.

A typical PPA is the S4804 by Applied Micro Circuits Corporation, a device that provides full-duplex mapping of packets or ATM cells to SONET/SDH payloads. Among other functions, the S4804 provides full section, line, and path overhead processing and is SONET/SDH standards compliant. In this application the device is used to decode incoming data, and to measure error rates and other attributes of the signal. The protocols have sufficiently distinctive features to allow the process of protocol recognition to be automated. In some cases, a number of like general PPA devices or modules may be employed where each is limited in its ability to recognise protocols, but the combined devices can recognise any of the protocols likely to be used. In such cases, the interaction between the devices may be mediated by a controller.

Figure 3:
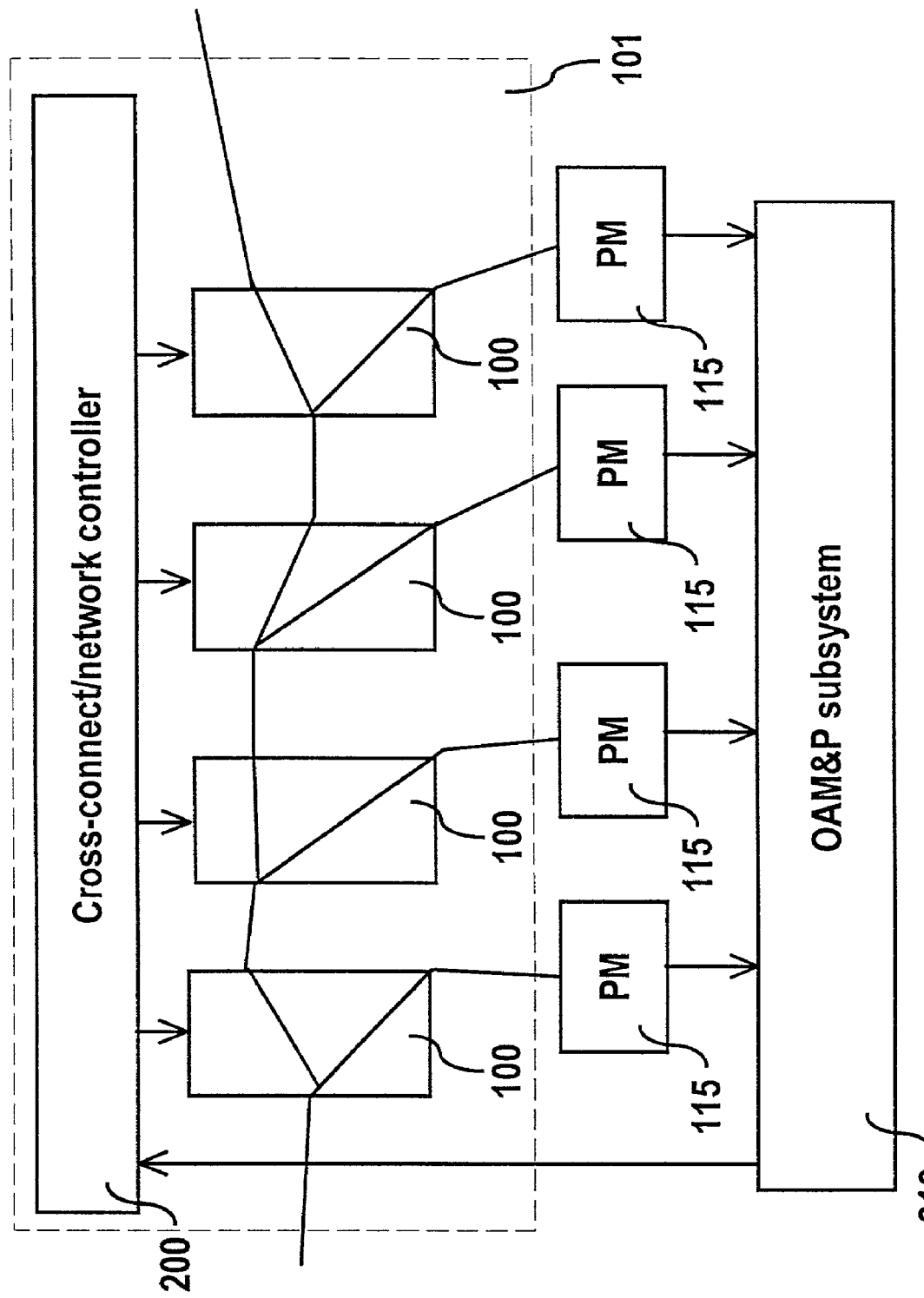
FIG. 3 gives an example of the invention applied to a four-stage network.

Referring finally to FIG. 3, this shows an example four stage network 101 in which each stage 100 is equipped to carry out the invention. The snooping or multicasting connections are typically monitored by an Operations, Administration, Maintenance, and Provisioning (OAM&P) subsystem 210. The OAM&P subsystem can request the network controller 200 to monitor any particular connection or part of connection within the network. This is done by invoking the multicast capability of the appropriate incoming port of the relevant cross-point device. The OAM&P subsystem 210, or the personnel monitoring it, can, by comparing the resulting outputs of the various PM 115 monitoring a given connection through the multi-stage network, determine where any error or other performance impairment is introduced. This effectively sectionalises the system, and in subsequent actions, the OAM&P subsystem might be used to remove a unit, subsystem or card from service, reroute connections to avoid such sections, isolate the problem, and call for maintenance replacement of apparently defective subsystems or parts.

The invention is unique in its use as a combination of known elements and techniques to perform a task not previously implemented in the art.

Distinguishing between Protocols

In order to ascertain the error rate for a given connection, the PPA should be capable of determining the actual protocol being used on a given connection. This is done by examining the bitstream as emitted by the CDR.

One possible technique to be used in the invention is described here for convenience, although it is well-known to those skilled in the art, and other techniques may also be used.

The determination of protocol proceeds in two phases. In the first phase, the bitstream is analysed and the line-code is resolved. This reduces the subsequent task of determining the actual protocol, since each of the well-known line-codes is only used by a subset of possible protocols. The second phase therefore is to analyse the bitstream in the light of the line-code being used, and find a protocol which successfully decodes the bitstream. If no such protocol can be determined by the equipment in use, then the invention cannot be used for that particular connection.

Line-codes with examples of relevant protocols is shown in Table 1.

TABLE 1

| Line Code | Protocols |
| --- | --- |
| 4B/5B | ANSI X3T9.5 Fiber Distributed Data Interface (FDDI), 100Base-X, ATM |
| 8B/10B | 802.3z, 802.3ab Gigabit Ethernet, ANSI X3.230-1994 standard for Fibre Channel |
| SONET | SONET/SDH |

Some notes to assist in the implementation of the invention are given below for convenience. Persons skilled in the art would understand that these notes relate to examples only and that alternative strategies might equally well be used.

SONET/SDH

SONET/SDH signals have a J0 byte defined in the section overhead in the frame, which is used to label the connection. The section Bit Interleaved Parity-8 (BIP-8) byte carries parity information for each corresponding bit of the previous frame, e.g., bit 0 of the BIP carries parity information for all bit 0 of the previous frame.

The following references, the basic standards for SONET/SDH are mentioned for convenience. Those skilled in the art will be aware of their existence, and that the most recent versions of protocols should generally be used in implementing such systems.

ANTI T1.105: SONET—Basic Description including Multiple Structure, Rates and Formats ANTI T1.119: SONET—Operations, Administration, Maintenance, and Provisioning (OAM&P)—Communications ITU-T G.707: Network Node Interface for the Synchronous Digital Hierarchy (SDH)

ITU-T G.781: Structure of Recommendations on Equipment for the Synchronous Digital Hierarchy (SDH)

Gigabit Ethernet

Gigabit Ethernet (IEEE 802.3z) follows the same form, fit and function as its 10-Mbps Ethernet and 100-Mbps Fast Ethernet precursors. In particular it uses the same variable-length (64- to 1514-byte packets) IEEE 802.3 frame format found in Ethernet and Fast Ethernet. However, Gigabit Ethernet uses 8B/10B coding in which every byte to be transmitted is first converted into a 10-bit Transmission Character. Since there are many more possible 10-bit Transmission Characters than are needed to map the particular bytes, most of the remaining 10-bit encodings are not defined, and only one is typically used. This is the special K28.5 Transmission Character, which contains a 7-bit string that cannot occur in any Data Transmission Character.

Because of this, the K28.5 is used as a special control character to identify reserved codes for frame delineation. Performance can be based on a count of coding violations to determine error rate.

Many alterations and modifications may be made by those having ordinary skill in the art without departing from the spirit and scope of the invention. Therefore, it must be understood that the illustrated embodiments have been set fourth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

I claim:

1. A signal monitoring and integrity checking system for use in a Dense Wavelength Division Multiplexing (DWDM) network, comprising:

an optical network including a first asynchronous cross-connect and a second asynchronous cross-connect, each for connecting an incoming link to an interconnecting link;

a first performance monitor for said first asynchronous cross-connect;

a second performance monitor for said second asynchronous cross-connect;

at least one first multi-cast means for multi-casting the input of said first asynchronous cross-connect to at least one first monitor port on said first asynchronous cross-connect, said first performance monitor communicating with said first monitor port;

at least one second multi-cast means for multi-casting the input of said second asynchronous cross-connect to at least one second monitor port on said second asynchronous cross-connect, said second performance monitor communicating with said second monitor port;

each of said performance monitors for detecting protocol and determining an error rate in accordance with said protocol;

a subsystem including at least one comparison system for comparing the outputs from said performance monitors to detect where performance impairment is introduced.

2. The system of claim 1, further comprising a signalling means for signaling results of said at least one comparison means to a maintenance subsystem.

3. The system of claim 1, wherein said comparison system is part of an Operation, Administration, Maintenance and Provisioning sub-system.

4. A method for signal monitoring and integrity checking in a Dense Wavelength Division Multiplexing network, comprising steps of:

1) multi-casting data at an input port of a first asynchronous cross-connect to a first connecting path and a first snooping path;

2) multi-casting data at an input port of a second asynchronous cross-connect to a second connecting path and a second snooping path;

3) monitoring said first snooping path connected to the multi-cast data of said step 1) with a first performance monitor, including:

determining the protocol of the data at said first snooping path, and
determining an error rate in accordance with said protocol;
4) monitoring said second snooping path connected to the multi-cast data of said step 2) with a second performance monitor, including:
determining the protocol of the data at said second snooping path, and
determining an error rate in accordance with said protocol;
5) comparing the output of said first performance monitor with the output of said second performance monitor;
6) signalling said result of the comparing step to an Operation, Administration, Maintenance and Provisioning (OAM&P) sub-system; and
7) at the OAM&P, in response to the result of the comparing step, detecting where performance impairment is introduced.

5. The method of claim 4, wherein the monitoring steps each comprises the following step:
1) detecting a line code of a connection to determine said protocol.

* * * * *